US012761584B2

(12) United States Patent
Furukawa et al.

(10) Patent No.: US 12,761,584 B2
(45) Date of Patent: Oct. 13, 2026

(54) ENDLESS BELT, INTERMEDIATE TRANSFER BELT, TRANSFER DEVICE, AND IMAGE FORMING APPARATUS

(71) Applicant: FUJIFILM Business Innovation Corp., Tokyo (JP)

(72) Inventors: Masato Furukawa, Kanagawa (JP); Yosuke Kubo, Kanagawa (JP); Hiroaki Tanaka, Kanagawa (JP); Ryosuke Kubota, Kanagawa (JP); Minoru Rokutan, Kanagawa (JP); Daisuke Tanemura, Kanagawa (JP); Masayuki Seko, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/811,179

(22) Filed: Aug. 21, 2024

(65) Prior Publication Data

US 2025/0291281 A1 Sep. 18, 2025

(30) Foreign Application Priority Data

Mar. 18, 2024 (JP) ................................ 2024-042785

(51) Int. Cl.
*G03G 15/16* (2006.01)
*G03G 15/00* (2006.01)
(Continued)

(52) U.S. Cl.
CPC ....... *G03G 15/162* (2013.01); *G03G 15/0131* (2013.01); *G03G 15/0189* (2013.01);
(Continued)

(58) Field of Classification Search
CPC .......... G03G 15/0131; G03G 15/0189; G03G 15/1605; G03G 15/162; G03G 15/1685; G03G 15/75; G03G 15/754; G03G 15/2017; G03G 15/2053; G03G 15/2057; G03G 15/206; G03G 2215/1661; G03G 2215/2009; G03G 2215/2016
See application file for complete search history.

(56) References Cited

U.S. PATENT DOCUMENTS 8,831,490 B2 * 9/2014 Inagaki ............... G03G 15/162 399/302
2012/0070202 A1 3/2012 Ichizawa
(Continued)

FOREIGN PATENT DOCUMENTS

JP S64-035464 A 2/1989
JP 2012-093686 A 5/2012
JP 2015-087546 A 5/2015

OTHER PUBLICATIONS

Feb. 11, 2025 Extended Search Report issued in European Patent Application No. 24196051.7.
(Continued)

*Primary Examiner* — Joseph S Wong
(74) *Attorney, Agent, or Firm* — Oliff PLC

(57) ABSTRACT

An endless belt contains a resin and electrically conductive particles, in which the endless belt has pores inside, and the pores are present such that a fraction of the pores increases from an outer peripheral surface side toward an inner peripheral surface side.

18 Claims, 3 Drawing Sheets

(51) Int. Cl.
*G03G 15/01* (2006.01)
*G03G 15/20* (2006.01)

(52) U.S. Cl.
CPC ..... *G03G 15/1605* (2013.01); *G03G 15/1685* (2013.01); *G03G 15/2017* (2013.01); *G03G 15/2053* (2013.01); *G03G 15/2057* (2013.01); *G03G 15/206* (2013.01); *G03G 15/75* (2013.01); *G03G 15/754* (2013.01); *G03G 2215/1661* (2013.01); *G03G 2215/2009* (2013.01); *G03G 2215/2016* (2013.01)

(56) References Cited

U.S. PATENT DOCUMENTS

| | | | |
|---|---|---|---|
| 2015/0139703 A1 | 5/2015 | Takazawa | |
| 2021/0063918 A1 | 3/2021 | Takazawa | |
| 2022/0146966 A1 | 5/2022 | Ono et al. | |
| 2023/0242358 A1* | 8/2023 | Shingu .................. | B32B 25/047 |

OTHER PUBLICATIONS

Nov. 27, 2025 Office Action issued in European Application No. 24196051.7.

* cited by examiner

ENDLESS BELT, INTERMEDIATE TRANSFER BELT, TRANSFER DEVICE, AND IMAGE FORMING APPARATUS

CROSS-REFERENCE TO RELATED APPLICATIONS

This application is based on and claims priority under 35 USC 119 from Japanese Patent Application No. 2024-042785 filed Mar. 18, 2024.

BACKGROUND

(i) Technical Field

The present disclosure relates to an endless belt, an intermediate transfer belt, a transfer device, and an image forming apparatus.

(ii) Related Art

In electrophotographic image forming apparatuses (such as copying machines, facsimiles, and printers), a toner image formed on a surface of an image holding member is transferred onto a surface of a recording medium and fixed on the recording medium to form an image. To transfer such a tone image onto a recording medium, for example, an intermediate transfer belt is used. Various endless belts such as transport belts are used not only in image forming apparatuses but also in other apparatuses.

For example, Japanese Unexamined Patent Application Publication No. 2015-87546 discloses "an endless belt having at least a base layer made of a resin and formed cylindrically, wherein the base layer contains one or two or more resins selected from polyamide-imide and polyimide, and the endless belt has multiple independent spheroidal pores in the base layer".

SUMMARY

Aspects of non-limiting embodiments of the present disclosure relate to an endless belt containing a resin and electrically conductive particles and having pores inside, in which the endless belt has better bending resistance during rotational driving than that in the case where there is no difference between a fraction of pores present on an outer peripheral surface side and a fraction of pores present on an inner peripheral surface side.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an endless belt containing a resin and electrically conductive particles, wherein the endless belt has pores inside, and the pores are present such that a fraction of the pores increases from an outer peripheral surface side toward an inner peripheral surface side.

BRIEF DESCRIPTION OF THE DRAWINGS

Exemplary embodiments of the present disclosure will be described in detail based on the following figures, wherein.

DETAILED DESCRIPTION

Figure 1:
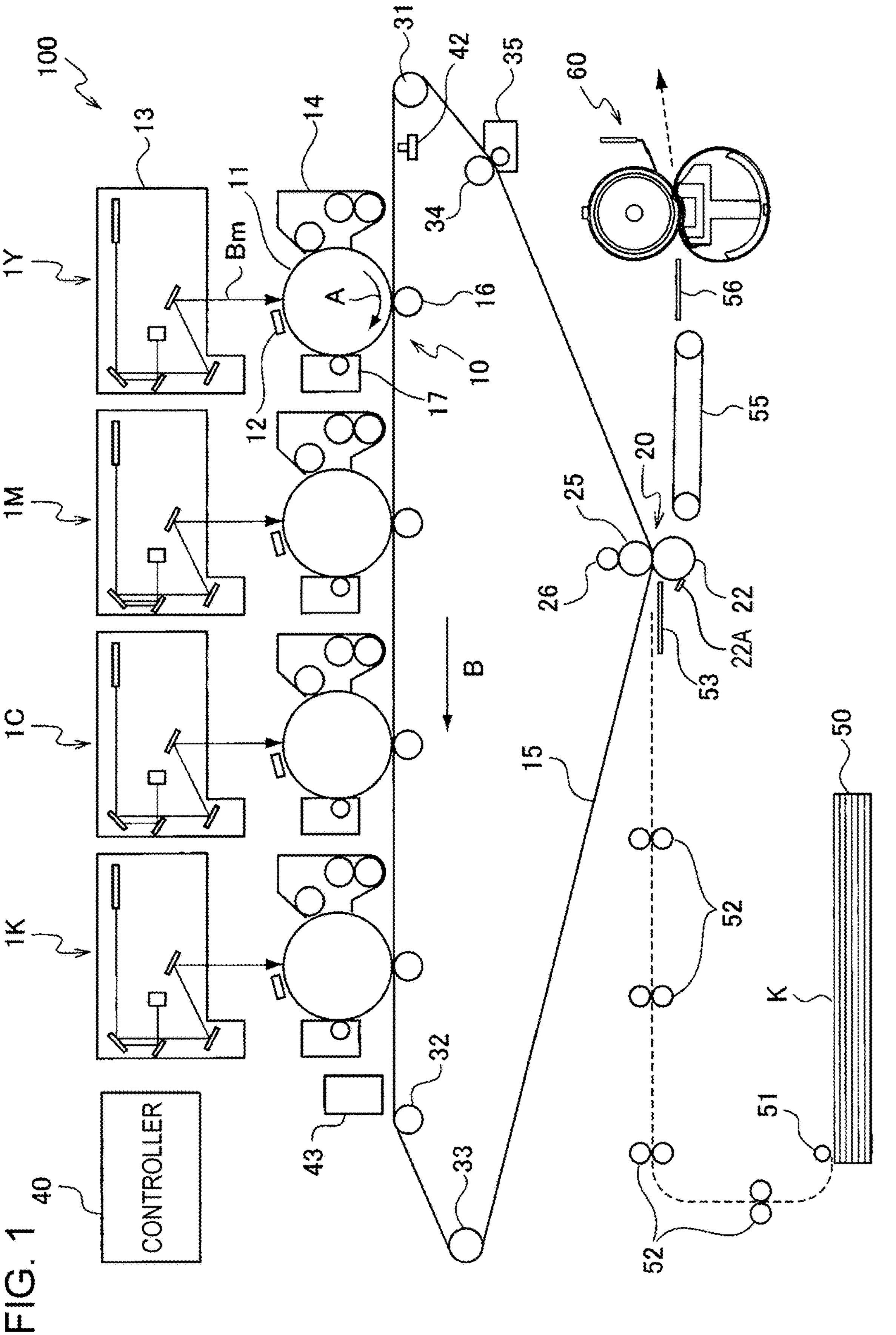
FIG. 1 is a schematic diagram illustrating an example of an image forming apparatus according to an exemplary embodiment.

Exemplary embodiments, which are examples of the present disclosure, will be described below. The following description and Examples are illustrative of the exemplary embodiments and are not intended to limit the scope of the exemplary embodiments.

In numerical ranges described in a stepwise manner in the exemplary embodiments, the upper limit value or the lower limit value of a numerical range may be replaced with the upper limit value or the lower limit value of another numerical range described in a stepwise manner. In a numerical range described in the exemplary embodiments, the upper limit value or the lower limit value of the numerical range may be replaced with a value described in Examples below.

In the exemplary embodiments, the term "step" refers not only to an independent step but also to a step that is not clearly distinguishable from other steps as long as an intended purpose of the step is achieved.

In the exemplary embodiments, when an exemplary embodiment is described with reference to a drawing, the configuration of the exemplary embodiment is not limited to the configuration illustrated in the drawing. The sizes of the members illustrated in each drawing are conceptual, and the relative relations between the sizes of the members are not limited to these relations.

In the exemplary embodiments, any component may include a plurality of types of substances corresponding to the component. In the exemplary embodiments, when a plurality of types of substances corresponding to a component are present in a composition, the amount of the component in the composition means the total amount of the plurality of types of substances that are present in the composition, unless otherwise specified.

Endless Belt

An endless belt according to an exemplary embodiment contains a resin and electrically conductive particles, in which the endless belt has pores inside, and the pores are present such that a fraction of the pores increases from an outer peripheral surface side toward an inner peripheral surface side.

With the above configuration, the endless belt according to the exemplary embodiment may be an endless belt having excellent bending resistance during rotational driving. The reason for this is as follows.

An endless belt having pores inside in order to improve bending resistance is known.

However, bending resistance may be insufficient in some cases when the endless belt is rotationally driven. This is probably because, during rotational driving of the endless belt, in bent portions that come in contact with rollers such as a driving roller and a support roller, different stresses are applied, more specifically, a compressive stress is applied to the inner peripheral surface side, and a tensile stress is applied to the outer peripheral surface side.

In view of the above, in the endless belt according to the exemplary embodiment, pores are present such that a fraction of the pores increases from the outer peripheral surface side toward the inner peripheral surface side. Accordingly, since many pores are present on the inner peripheral surface side, the compressive stress may be relaxed by the pores. In contrast, since few pores and a large amount of the resin are present on the outer peripheral surface side, resistance to the tensile stress may be enhanced.

This may be the reason that the endless belt according to the exemplary embodiment may be an endless belt having excellent bending resistance during rotational driving.

The endless belt according to the exemplary embodiment will be described in detail below.

Pore Structure

The endless belt according to the exemplary embodiment has pores (i.e., bubbles) inside and has a porous structure in which a fraction of the pores increases from the outer peripheral surface side toward the inner peripheral surface side.

Herein, the "porous structure in which a fraction of the pores increases from the outer peripheral surface side toward the inner peripheral surface side" refers to a structure in which an area fraction Ao of pores, an area fraction Am of pores, and an area fraction Ai of pores described later sequentially increase.

However, if the difference between the area fraction Ao of pores, the area fraction Am of pores, and the area fraction Ai of pores is within a range of ±10%, it is regarded that the amount of pores present is uniform from the outer peripheral surface side toward the inner peripheral surface side.

Area Fraction of Pores

The endless belt according to the exemplary embodiment has a structure in which, in a section in a belt thickness direction, for example, an area fraction Ao of pores present on the outer peripheral surface side is 0% or more and 2.0% or less, an area fraction Am of pores present in a thickness center portion is 0.5% or more and 8.5% or less, and an area fraction Ai of pores present on the inner peripheral surface side is 1.5% or more and 21.5% or less.

The area fraction Ao of pores present on the outer peripheral surface side is preferably 0.05% or more and 1.5% or less, more preferably 0.3% or more and 1.3% or less.

The area fraction Am of pores present in the thickness center portion is preferably 1.0% or more and 5.0% or less, more preferably 1.0% or more and 4.5% or less.

The area fraction Ai of pores present on the inner peripheral surface side is preferably 2.0% or more and 20.0% or less, more preferably 10% or more and 20% or less.

From the viewpoint of improving bending resistance during rotational driving, a ratio Ao/Am of the area fraction Ao of pores to the area fraction Am of pores is preferably 0 or more and 0.9 or less, more preferably 0.1 or more and 0.8 or less, still more preferably 0.1 or more and 0.4 or less.

From the same viewpoint, a ratio Am/Ai of the area fraction Am of pores to the area fraction Ai of pores is preferably 0 or more and 0.9 or less, more preferably 0.1 or more and 0.8 or less, still more preferably 0.1 or more and 0.6 or less.

From the viewpoint of improving bending resistance during rotational driving, an area fraction A of pores when an outer peripheral surface is observed is preferably 0.01% or more and 1.2% or less, more preferably 0.01% or more and 1.0% or less, still more preferably 0.05% or more and 0.6% or less.

In particular, when the area fraction A of pores is within the above range, few pores are exposed on the outer peripheral surface of the belt, and the outer peripheral surface of the belt has high flatness. Accordingly, for example, use of the endless belt as an intermediate transfer belt or the like may suppress a decrease in transferability of a toner image.

Herein, the methods for measuring the area fractions of pores present on the outer peripheral surface side, in the thickness center portion, and on the inner peripheral surface side of the endless belt are as follows.

A test piece cut in the thickness direction is taken from a target endless belt.

Next, the cut surface of the test piece is used as an observation surface and observed with a scanning electron microscope (SEM).

Specifically, a region with a size of 30 μm×40 μm, the region having, as one side, a side corresponding to the outer peripheral surface of the belt is observed at a magnification of 3,000 times, and an area fraction of pores to the observation region is determined. This operation is performed for five test pieces, and the arithmetic mean value of the area fractions of the pores is defined as the area fraction Ao of pores present on the outer peripheral surface side.

A region with a size of 30 μm×40 μm, the region being centered at a position of ½ thickness of the belt, is observed at a magnification of 3,000 times, and an area fraction of pores to the observation region is determined. This operation is performed for five test pieces, and the arithmetic mean value of the area fractions of the pores is defined as the area fraction Am of pores present in the thickness center portion.

A region with a size of 30 μm×40 μm, the region having, as one side, a side corresponding to the inner peripheral surface of the belt, is observed at a magnification of 3,000 times, and an area fraction of pores to the observation region is determined. This operation is performed for five test pieces, and the arithmetic mean value of the area fractions of the pores is defined as the area fraction Ai of pores present on the inner peripheral surface side.

The method for measuring the area fraction A of pores when the outer peripheral surface of the endless belt is observed is as follows.

A test piece including the outer peripheral surface of a belt is taken from a target endless belt.

Next, in the test piece, the outer peripheral surface of the belt is used as an observation surface and observed with a scanning electron microscope (SEM).

Specifically, a region with a size of 30 μm×40 μm is observed at a magnification of 3,000 times, and an area fraction of pores to the observation region is determined. This operation is performed for five test pieces, and the arithmetic mean value of the area fractions of pores is defined as the area fraction A of pores when the outer peripheral surface of the endless belt is observed.

Average Pore Diameter of Pores

In the endless belt according to the exemplary embodiment, the pore diameters of pores (i.e., bubble) present inside may increase from the outer peripheral surface side toward the inner peripheral surface side.

Herein, the expression "the pore diameters increase from the outer peripheral surface side toward the inner peripheral surface side" refers to a structure in which an average pore diameter Do of pores, an average pore diameter Dm of pores, and an average pore diameter Di of pores described later sequentially increase.

However, if the difference between the average pore diameter Do of pores, the average pore diameter Dm of pores, and the average pore diameter Di of pores is within a range of ±0.01%, it is regarded that the pore diameters are uniform from the outer peripheral surface side toward the inner peripheral surface side.

Specifically, the endless belt according to the exemplary embodiment preferably has a porous structure in which, for example, in a section in the belt thickness direction, the average pore diameter Do of pores present on the outer peripheral surface side is 0 μm or more and 2.5 μm or less, the average pore diameter Dm of pores present in the thickness center portion is 0.1 μm or more and 6.0 μm or less, and the average pore diameter Di of pores present on the inner peripheral surface side is 0.3 μm or more and 11.0 μm or less.

In a section in the belt thickness direction, the average pore diameter Do of pores present on the outer peripheral surface side is more preferably 0 μm or more and 1.5 μm or less, still more preferably 0 μm or more and 1.2 μm or less.

The average pore diameter Dm of pores present in the thickness center portion is more preferably 0.5 μm or more and 5.0 μm or less.

The average pore diameter Di of pores present on the inner peripheral surface side is more preferably 0.6 μm or more and 10.0 μm or less.

From the viewpoint of improving bending resistance during rotational driving, a ratio Do/Dm of the average pore diameter Do of pores to the average pore diameter Dm of pores is preferably 0 or more and 1.5 or less, more preferably 0 or more and 1.0 or less, still more preferably 0.1 or more and 0.5 or less.

From the same viewpoint, a ratio Dm/Di of the average pore diameter Dm of pores to the average pore diameter Di of pores is preferably 0.1 or more and 2.0 or less, more preferably 0.2 or more and 1.4 or less, still more preferably 0.2 or more and 0.5 or less.

Herein, the methods for measuring the average pore diameters of pores present on the outer peripheral surface side, in the thickness center portion, and on the inner peripheral surface side of the endless belt are as follows.

A test piece cut in the thickness direction is taken from a target endless belt.

Next, the cut surface of the test piece is used as an observation surface and observed with a scanning electron microscope (SEM).

Specifically, a region with a size of 9 μm×12 μm, the region having, as one side, a side corresponding to the outer peripheral surface of the belt, is observed at a magnification of 10,000 times, and equivalent circle diameters of pores present in the viewing field are determined. This operation is performed for 10 test pieces, and the arithmetic mean value of the equivalent circle diameters of the pores is defined as the average pore diameter Do of pores present on the outer peripheral surface side.

A region with a size of 9 μm×12 μm, the region being centered at a position of ½ thickness of the belt, is observed at a magnification of 10,000 times, and equivalent circle diameters of pores present in the viewing field are determined. This operation is performed for 10 test pieces, and the arithmetic mean value of the equivalent circle diameters of the pores is defined as the average pore diameter Dm of pores present in the thickness center portion.

A region with a size of 9 μm×12 μm, the region having, as one side, a side corresponding to the inner peripheral surface of the belt, is observed at a magnification of 10,000 times, and equivalent circle diameters of pores present in the viewing field are determined. This operation is performed for 10 test pieces, and the arithmetic mean value of the equivalent circle diameters of the pores is defined as the average pore diameter Di of pores present on the inner peripheral surface side.

Composition

The endless belt according to the exemplary embodiment contains a resin and electrically conductive particles. Specifically, for example, the endless belt is formed of a single-layer body of a resin layer containing electrically conductive particles.

In particular, the endless belt (the resin layer constituting the endless belt) may contain a silicone oil from the viewpoint of improving bending resistance during rotational driving. The endless belt (the resin layer constituting the endless belt) may optionally contain well-known other components.

Resin

Examples of the resin include polyimide resins (PI resins), polyamide-imide resins (PAI resins), aromatic polyether ketone resins (e.g., aromatic polyether ether ketone resins), polyphenylene sulfide resins (PPS resins), polyetherimide resins (PEI resins), polyester resins, polyamide resins, and polycarbonate resins.

From the viewpoint of improving bending resistance during rotational driving, the resin is preferably a polyimide-based resin (that is, a resin including a structural unit having an imide bond), more preferably a polyimide resin or a polyamide-imide resin, still more preferably a polyimide resin.

Examples of the polyimide resin include imidized products of polyamic acids (precursors of polyimide resins), which are polymers of tetracarboxylic dianhydrides and diamine compounds.

Examples of the polyimide resin include resins having a structural unit represented by a general formula (I) below.

General formula (I)

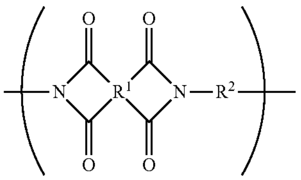

In the general formula (I), $R^1$ represents a tetravalent organic group and $R^2$ represents a divalent organic group.

Examples of the tetravalent organic group represented by $R^1$ include aromatic groups, aliphatic groups, alicyclic groups, groups formed by combining an aromatic group and an aliphatic group, and substituted groups thereof. Specific examples of the tetravalent organic group include residues of tetracarboxylic dianhydrides described later.

Examples of the divalent organic group represented by $R^2$ include aromatic groups, aliphatic groups, alicyclic groups, groups formed by combining an aromatic group and an aliphatic group, and substituted groups thereof. Specific examples of the divalent organic group include residues of diamine compounds described later.

Specific examples of the tetracarboxylic dianhydride used as a raw material of the polyimide resin include pyromellitic dianhydride, 3,3',4,4'-benzophenonetetracarboxylic dianhydride, 3,3',4,4'-biphenyltetracarboxylic dianhydride, 2,3,3',4-biphenyltetracarboxylic dianhydride, 2,3,6,7-naphthalenetetracarboxylic dianhydride, 1,2,5,6-naphthalenetetracarboxylic dianhydride, 1,4,5,8-naphthalenetetracarboxylic dianhydride, 2,2'-bis(3,4-dicarboxyphenyl) sulfonic dianhydride, perylene-3,4,9,10-tetracarboxylic dianhydride, bis(3,4-dicarboxyphenyl) ether dianhydride, and ethylenetetracarboxylic dianhydride.

Specific examples of the diamine compound used as a raw material of the polyimide resin include 4,4'-diaminodiphenyl ether, 4,4'-diaminodiphenylmethane, 3,3'-diaminodiphenylmethane, 3,3'-dichlorobenzidine, 4,4'-diaminodiphenyl sulfide, 3,3'-diaminodiphenyl sulfone, 1,5-diaminonaphthalene, m-phenylenediamine, p-phenylenediamine, 3,3'-dimethyl-4,4'-biphenyldiamine, benzidine, 3,3'-dimethylbenzidine, 3,3'-dimethoxybenzidine, 4,4'-diaminodiphenyl sulfone, 4,4'-diaminodiphenylpropane, 2,4-bis(β-amino-tert-butyl)toluene, bis(p-β-amino-tert-butylphenyl) ether, bis(p-β-methyl-δ-aminophenyl) benzene, bis-p-(1,1-dimethyl-5-amino-pentyl)benzene, 1-isopropyl-2,4-m-phenylenediamine, m-xylylenediamine, p-xylylenediamine, di(p-aminocyclohexyl)methane, hexamethylenediamine, heptamethylenediamine, octamethylenediamine, nonamethylenediamine, decamethylenediamine, diaminopropyltetramethylenediamine, 3-methylheptamethylenediamine, 4,4-dimethylheptamethylenediamine, 2,11-diaminododecane, 1,2-bis-3-aminopropoxyethane, 2,2-dimethylpropylenediamine, 3-methoxyhexamethylenediamine, 2,5-dimethylheptamethylenediamine, 5-methylnonamethylenediamine, 2,17-diaminoeicosadecane, 1,4-diaminocyclohexane, 1,10-diamino-1,10-dimethyldecane, 12-diaminooctadecane, 2,2-bis[4-(4-aminophenoxy)phenyl]propane, piperazine, $H_2N(CH_2)_3O(CH_2)_2O(CH_2)NH_2$, $H_2N(CH_2)_3S(CH_2)_3NH_2$, and $H_2N(CH_2)_3N(CH_3)_2(CH_2)_3NH_2$.

Examples of the polyamide-imide resin include resins having a repeating unit including an imide bond and an amide bond.

Specific examples of the polyamide-imide resin include polymers of a trivalent carboxylic acid compound (also referred to as a tricarboxylic acid) having an acid anhydride group and a diisocyanate compound or a diamine compound.

Examples of the tricarboxylic acid include trimellitic anhydride and derivatives thereof. The tricarboxylic acid may be used in combination with a tetracarboxylic dianhydride, an aliphatic dicarboxylic acid, an aromatic dicarboxylic acid, or the like.

Examples of the diisocyanate compound include 3,3'-dimethylbiphenyl-4,4'-diisocyanate, 2,2'-dimethylbiphenyl-4,4'-diisocyanate, biphenyl-4,4'-diisocyanate, biphenyl-3,3'-diisocyanate, biphenyl-3,4'-diisocyanate, 3,3'-diethylbiphenyl-4,4'-diisocyanate, 2,2'-diethylbiphenyl-4,4'-diisocyanate, 3,3'-dimethoxybiphenyl-4,4'-diisocyanate, 2,2'-dimethoxybiphenyl-4,4'-diisocyanate, naphthalene-1,5-diisocyanate, and naphthalene-2,6-diisocyanate.

Examples of the diamine compound include compounds that have a structure similar to that of any of the foregoing isocyanates and that have amino groups instead of isocyanato groups.

The content of the resin in the endless belt (the resin layer constituting the endless belt) is preferably 60% by mass or more and 95% by mass or less, more preferably 70% by mass or more and 95% by mass or less, still more preferably 75% by mass or more and 90% by mass or less.

Electrically Conductive Particles

Examples of the electrically conductive particles include electrically conductive powders (e.g., volume resistivity: less than $10^7$ Ω·cm, the same applies hereinafter) and semiconductive powders (e.g., volume resistivity: $10^7$ Ω·cm or more and $10^{13}$ Ω·cm or less, the same applies hereinafter).

Specifically, examples of the electrically conductive particles include electrically conductive carbon particles and metal oxide particles.

The electrically conductive carbon particles may be, for example, particles of carbon black.

Examples of the carbon black include Ketjen black, oil furnace black, channel black, and acetylene black. The carbon black used may be carbon black with a treated surface (hereinafter, also referred to as "surface-treated carbon black").

The surface-treated carbon black is obtained by, for example, providing, a carboxy group, a quinone group, a lactone group, a hydroxy group, or the like on the surface of the carbon black. Examples of the surface treatment method include an air oxidation method in which carbon black is brought into contact and caused to react with air in a high-temperature atmosphere, a method in which carbon black is caused to react with a nitrogen oxide or ozone at room temperature (e.g., 22° C.), and a method in which carbon black is oxidized with air in a high-temperature atmosphere and then oxidized by ozone at a low temperature.

Examples of the metal oxide particles include tin oxide particles, titanium oxide particles, zinc oxide particles, and zirconium oxide particles.

Other examples of the electrically conductive particles include metal particles (such as aluminum particles and nickel particles) and ionically conductive particles (such as potassium titanate particles and LiCl particles).

Of these, the electrically conductive particles are preferably carbon black particles from the viewpoint of improving electrical properties.

The average primary particle diameter of the electrically conductive particles is preferably 2 nm or more and 40 nm or less, more preferably 8 nm or more and 20 nm or less, still more preferably 10 nm or more and 15 nm or less.

The method for measuring the average primary particle diameter of electrically conductive particles is as follows.

First, a measurement sample having a thickness of 100 nm is taken from an endless belt (a resin layer constituting the endless belt) with a microtome, and the measurement sample is observed with a transmission electron microscope (TEM). Subsequently, the diameters of circles having areas equal to the projected areas (i.e., equivalent circle diameters) of 50 primary particles of electrically conductive particles are determined as their particle diameters, and the average value of the particle diameters is defined as the average primary particle diameter.

The content of the electrically conductive particles in the endless belt (the resin layer constituting the endless belt) is preferably 10% by mass or more and 50% by mass or less, more preferably 12% by mass or more and 40% by mass or less, still more preferably 15% by mass or more and 30% by mass or less.

Silicone Oil

A silicone oil partially volatilizes during formation of the endless belt (the resin layer constituting the endless belt) to form pores (i.e., bubbles) inside the belt and has a function of forming the porous structure having the area fractions of pores and the average pore diameters of pores described above.

Examples of the silicone oil include straight silicones such as dimethyl silicone oil, methyl hydrogen silicone oil, diphenyl silicone oil, methyl phenyl silicone oil, and chlorophenyl silicone oil; and modified silicone oils such as alkyl-modified silicone oils, aralkyl-modified silicone oils, polyether-modified silicone oils, polyester-modified silicone oils, fluoroalkyl-modified silicone oils, amino-modified silicone oils, alkoxy-modified silicone oils, epoxy-modified silicone oils, and carboxyl-modified silicone oils.

Of these, polyether-modified silicone oils are preferably used as the silicone oil from the viewpoint of forming the porous structure having the area fractions of pores and the average pore diameters of pores described above.

Examples of the polyether-modified silicone oils include silicone oils in which at least one of the side chains and terminals of the polysiloxane chain is modified with a polyalkylene oxide.

In particular, from the viewpoint of forming the porous structure having the area fractions of pores and the average pore diameters of pores described above, the number-average molecular weight of the polyether-modified silicone oil is preferably 300 or more and 20,000 or less, more preferably 300 or more and 10,000 or less, still more preferably 500 or more and 10,000 or less.

The number-average molecular weight of the silicone oil is measured by gel permeation chromatography (GPC). The molecular weight measurement by GPC is conducted using, as a measurement apparatus, GPC·HLC-8120GPC manufactured by Tosoh Corporation and using a TSKgel SuperHM-M (15 cm) column manufactured by Tosoh Corporation and a tetrahydrofuran (THF) solvent. The number-average molecular weight is calculated from the measurement results using a molecular weight calibration curve prepared using monodispersed polystyrene standard samples.

Other Components

Examples of the other components include fillers for improving mechanical strength, antioxidants for preventing thermal degradation of the belt, surfactants for improving fluidity, and heat-resistant anti-aging agents.

When any of the other components is contained, the content of the other component in the endless belt (the resin layer constituting the endless belt) is preferably more than 0% by mass and 10% by mass or less, more preferably more than 0% by mass and 5% by mass or less, still more preferably more than 0% by mass and 1% by mass or less.

Thickness of Endless Belt

The thickness of the endless belt (the resin layer constituting the endless belt) according to the exemplary embodiment is, for example, preferably 60 μm or more and 120 μm or less, more preferably 60 μm or more and 110 μm or less.

The thickness of the endless belt is measured as follows.

Specifically, a section of the endless belt in the thickness direction is observed with an optical microscope or a scanning electron microscope, the thickness of the endless belt to be measured is measured at 10 positions, and the average value of the thicknesses is defined as the thickness.

Young's Modulus

The Young's modulus of the endless belt according to the exemplary embodiment is preferably 2,900 MPa or more and 5,500 MPa or less, more preferably 3,000 MPa or more and 3,600 MPa or less from the viewpoint of improving bending resistance during rotational driving.

The Young's modulus of the endless belt is adjusted by, for example, the type of the resin and the weight-average molecular weight of the resin.

The method for measuring the Young's modulus of the endless belt is as follows.

A tensile tester (MODEL-1605N, manufactured by Aikoh Engineering Co., Ltd.) is used. A test piece is cut to a size of 80 mm×5 mm such that a long side extends to the circumferential direction of the endless belt, and furthermore, a test is performed at a tensile speed of 20 mm/min under the condition in which the length of the test piece between chuck jigs is 40 mm. The Young's modulus is calculated from the slope of a region where the S-S curve is linear (the strain is 10 N to 38 N).

Method for Producing Endless Belt

A method for producing an endless belt according to the exemplary embodiment include, for example, a step of applying a resin solution containing a resin or a precursor of the resin and electrically conductive particles onto a surface of a die to form a coating film; a step of drying the coating film by heating and, as needed, causing a reaction of the precursor (for example, in the case of a precursor of a polyimide resin, imidization) to form a resin coating film; and a step of releasing the resin coating film from the die.

The resin coating film is released from the die to thereby obtain an endless belt.

The die is not limited, but a cylindrical die may be used. The base may be a metal base. The die used may be a die made of a material other than metal, such as a resin, glass, or ceramic, instead of a metal die. A glass coating, a ceramic coating, or the like may be provided on the surface of the die, or a release agent, such as a silicone release agent or a fluorine release agent, may be applied to the surface of the die.

Examples of the method for applying the resin solution include common methods such as blade coating, wire bar coating, spray coating, dip coating, bead coating, air knife coating, and curtain coating methods.

In the method for producing an endless belt according to the exemplary embodiment, a resin solution containing a silicone oil can be used, and the conditions for drying the coating film by heating (drying temperature and drying air speed) can be adjusted, thereby varying the volatilization state of the silicone oil in the thickness direction of the belt. This provides an endless belt having the porous structure having the area fractions of pores and the average pore diameters of pores described above.

Applications of Endless Belt

The endless belt according to the exemplary embodiment can be used as, for example, an endless belt for an electrophotographic image forming apparatus. Examples of endless belts for electrophotographic image forming apparatuses include intermediate transfer belts, transfer belts (i.e., recording medium transport belts), fixing belts (such as heating belts and pressing belts), and transport belts (i.e., recording medium transport belts).

The endless belt according to the exemplary embodiment may be used not only for endless belts for electrophotographic image-forming apparatuses, but also for, for example, belt-shaped members such as transport belts, drive belts, laminate belts, electrical insulating materials, pipe covering materials, electromagnetic wave insulation materials, heat source insulators, and electromagnetic wave absorbing films.

The endless belt according to the exemplary embodiment may be provided with a functional layer on the outer peripheral surface side or the inner peripheral surface side according to the application. However, the endless belt according to the exemplary embodiment may be used as a resin base layer.

Transfer Device

A transfer device according to the exemplary embodiment includes an intermediate transfer belt having an outer peripheral surface onto which a toner image is to be transferred; a first transfer unit including a first transfer member that first-transfers a toner image formed on a surface of an image holding member onto the outer peripheral surface of the intermediate transfer belt; and a second transfer unit including a second transfer member that is disposed in contact with the outer peripheral surface of the intermediate transfer belt and that second-transfers the toner image transferred onto the outer peripheral surface of the intermediate transfer belt onto a surface of a recording medium.

As the intermediate transfer belt, an intermediate transfer belt including the endless belt according to the exemplary embodiment described above is used.

The transfer device according to the exemplary embodiment may include a well-known unit such as a cleaning unit having a cleaning member that cleans the outer peripheral surface of the intermediate transfer belt.

Intermediate Transfer Belt

The intermediate transfer belt includes the endless belt according to the exemplary embodiment.

The intermediate transfer belt may be a single-layer body of the endless belt or may be a multilayer body including the endless belt as a resin base layer. The multilayer body may be, for example, a multilayer body including a resin base layer, an elastic layer disposed on the resin base layer, and a release layer disposed on the elastic layer, or a multilayer body including a resin base layer and a release layer disposed on the resin base layer.

The elastic layer will be described.

The elastic layer contains a heat-resistant elastic material.

Examples of the heat-resistant elastic material include silicone rubber and fluororubber.

Examples of the silicone rubber include room temperature vulcanizing (RTV) silicone rubber, high temperature vulcanizing (HTV) silicone rubber, and liquid silicone rubber. Specific examples thereof include polydimethyl silicone rubber, methylvinyl silicone rubber, methylphenyl silicone rubber, and fluorosilicone rubber.

Examples of the fluororubber include vinylidene fluoride-based rubber, tetrafluoroethylene/propylene-based rubber, tetrafluoroethylene/perfluoromethyl vinyl ether rubber, phosphazene-based rubber, and fluoropolyether.

The elastic layer may contain other components. Examples of the other components include fillers, conducting agents, softeners (such as a paraffin-based softener), processing aids (such as stearic acid), anti-aging agents (such as an amine-based anti-aging agent), vulcanizing agents (such as sulfur, a metal oxide, and a peroxide), and functional fillers (such as alumina).

The release layer will be described.

The release layer contains, for example, a heat-resistant release material.

Examples of the heat-resistant release material include fluororubber, fluororesins, silicone resins, and polyimide resins.

In particular, the heat-resistant release material may be a fluororesin. Specific examples of the fluororesin include tetrafluoroethylene/perfluoroalkyl vinyl ether copolymers (PFA), polytetrafluoroethylene (PTFE), tetrafluoroethylene/hexafluoropropylene copolymers (FEP), polyethylene-tetrafluoroethylene copolymers (ETFE), polyvinylidene fluoride (PVDF), polychlorotrifluoroethylene (PCTFE), and polyvinyl fluoride (PVF).

The intermediate transfer belt may have any well-known structure as long as the endless belt according to the exemplary embodiment is included.

Volume Resistivity of Intermediate Transfer Belt

The common logarithm of the volume resistivity of the intermediate transfer belt determined when a voltage of 100 V is applied to the intermediate transfer belt for 10 seconds is preferably 8.0 (log Ω·cm) or more and 13.5 (log Ω·cm) or less, more preferably 8.5 (log Ω·cm) or more and 13.2 (log Ω·cm) or less.

The volume resistivity of the intermediate transfer belt determined when a voltage of 100 V is applied to the intermediate transfer belt for 10 seconds is measured by the following method.

The volume resistivity (log Ω·cm) is measured using a micro current meter (R8430A, manufactured by Advantest Corporation) as a resistance measuring device and a UR prove (manufactured by Mitsubishi Chemical Analytech Co., Ltd.) as a probe at 18 positions in total, specifically, at three positions of a center portion and both end portions of the intermediate transfer belt in the width direction with respect to six positions spaced at regular intervals in the circumferential direction, by applying a voltage of 100 V and a pressure of 1 kgf for an application time of 10 seconds. The average of the measured volume resistivity values is calculated. The measurement is performed in an environment at a temperature of 22° C. and a humidity of 55% RH.

Surface Resistivity of Intermediate Transfer Belt

The common logarithm of the surface resistivity of the intermediate transfer belt determined when a voltage of 100 V is applied to the outer peripheral surface of the intermediate transfer belt for 10 seconds is preferably 9.5 (log Ω/sq.) or more and 15.0 (log Ω/sq.) or less, more preferably 10.5 (log Ω/sq.) or more and 14.0 (log Ω/sq.) or less, particularly preferably 11.0 (log Ω/sq.) or more and 13.5 (log Ω/sq.) or less.

The unit of the surface resistivity "log Ω/sq." expresses a surface resistivity in terms of the logarithm of a resistance value per unit area and is also denoted as, for example, log(Ω/sq.), log Ω/square, or log Ω/□.

The surface resistivity of the intermediate transfer belt determined when a voltage of 100 V is applied to the outer peripheral surface of the intermediate transfer belt for 10 seconds is measured by the following method.

The surface resistivity (log Ω/sq.) of the outer peripheral surface of the intermediate transfer belt is measured using a micro current meter (R8430A, manufactured by Advantest Corporation) as a resistance measuring device and a UR prove (manufactured by Mitsubishi Chemical Analytech Co., Ltd.) as a probe at 18 positions in total, specifically, at three positions of a center portion and both end portions of the outer peripheral surface of the intermediate transfer belt in the width direction with respect to six positions spaced at regular intervals in the circumferential direction, by applying a voltage of 100 V and a pressure of 1 kgf for an application time of 10 seconds. The average of the measured surface resistivity values is calculated. The measurement is performed in an environment at a temperature of 22° C. and a humidity of 55% RH.

First Transfer Unit

In the first transfer unit, the first transfer member is arranged to face the image holding member with the intermediate transfer belt therebetween. In the first transfer unit, the first transfer member applies a voltage having a polarity opposite to the charge polarity of the toner to the intermediate transfer belt, and the toner image is thereby first-transferred onto the outer peripheral surface of the intermediate transfer belt.

Second Transfer Unit

In the second transfer unit, the second transfer member is disposed on a side of the intermediate transfer belt on which the toner image is held. The second transfer unit includes, for example, in addition to the second transfer member, a backing member disposed on a side of the intermediate transfer belt which is opposite to the side on which the toner image is held. In the second transfer unit, the intermediate transfer belt and a recording medium are sandwiched between the second transfer member and the backing member, and a transfer electric field is formed. Thus, the toner image on the intermediate transfer belt is second-transferred onto the recording medium.

The second transfer member may be a second transfer roller or a second transfer belt. The backing member is, for example, a backing roller.

Cleaning Unit

In the cleaning unit, the cleaning member is disposed on a side of the intermediate transfer belt on which the toner image is held. The cleaning unit includes, for example, in addition to the cleaning member, a backing member disposed on a side of the intermediate transfer belt which is opposite to the side on which the toner image is held. In the cleaning unit, for example, while the intermediate transfer belt is sandwiched between the cleaning member and the backing member, the outer peripheral surface of the intermediate transfer belt is cleaned with the cleaning member.

The cleaning member may be, for example, a cleaning blade or a cleaning brush.

The transfer device according to the exemplary embodiment may be a transfer device that transfers a toner image onto the surface of a recording medium through a plurality of intermediate transfer bodies. Specifically, the transfer device may be, for example, a transfer device that first-transfers a toner image from an image holding member onto a first intermediate transfer body, second-transfers the toner image from the first intermediate transfer body onto a second intermediate transfer body, and then third-transfers the toner image from the second intermediate transfer body onto a recording medium.

At least one of the plurality of intermediate transfer bodies included in the transfer device is an intermediate transfer belt including the endless belt according to the exemplary embodiment described above.

Image Forming Apparatus

An image forming apparatus according to the exemplary embodiment includes a toner image forming device that includes an image holding member and that forms a toner image on a surface of the image holding member, and a transfer device that transfers the toner image formed on the surface of the image holding member onto a surface of a recording medium. The transfer device is the transfer device according to the exemplary embodiment described above.

An example of the toner image forming device includes, for example, an image holding member, a charging unit that charges the surface of the image holding member, an electrostatic latent image forming unit that forms an electrostatic latent image on the charged surface of the image holding member, and a developing unit that develops the electrostatic latent image formed on the surface of the image holding member with a developer containing a toner to form a toner image.

Examples of an image forming apparatus applied to the image forming apparatus according to the exemplary embodiment include well-known image forming apparatuses, such as an apparatus including a fixing device that fixes a toner image transferred onto the surface of a recording medium; an apparatus including a cleaning device that cleans the surface of the image holding member after transfer of the toner image and before charging; an apparatus including a static elimination device that eliminates electricity by irradiating the surface of the image holding member with static elimination light after transfer of the toner image and before charging; and an apparatus including an image holding member heating member that increases the temperature of the image holding member and decreases the relative temperature.

The image forming apparatus according to the exemplary embodiment may be either a dry development-system image forming apparatus or a wet development-system (development system using a liquid developer) image forming apparatus.

In the image forming apparatus according to the exemplary embodiment, for example, a part provided with the image holding member may have a cartridge structure (process cartridge) that is detachably attachable to the image forming apparatus. For example, a process cartridge including a toner image forming device and a transfer device may be used as the process cartridge.

An example of the image forming apparatus according to the exemplary embodiment will be described below with reference to the drawings. Note that the image forming apparatus according to the exemplary embodiment is not limited thereto. Major components illustrated in the drawings will be described below, and the description of other components will be omitted.

Image Forming Apparatus

FIG. 1 is a schematic diagram illustrating the structure of an image forming apparatus according to the exemplary embodiment.

As illustrated in FIG. 1, an image forming apparatus 100 according to the exemplary embodiment is, for example, an intermediate-transfer image forming apparatus, which is commonly referred to as a tandem image forming apparatus. The image forming apparatus 100 includes a plurality of image forming units 1Y, 1M, 1C, and 1K (examples of the toner image forming devices) that form toner images of respective color components by an electrophotographic system; first transfer sections 10 that sequentially transfer (first-transfer) the toner images of respective color components formed by the image forming units 1Y, 1M, 1C, and 1K onto an intermediate transfer belt 15; a second transfer section 20 that collectively transfers (second-transfers) the superimposed toner images transferred onto the intermediate transfer belt 15 onto a paper sheet K, which is a recording medium; and a fixing device 60 that fixes the second-transferred images onto the paper sheet K. The image forming apparatus 100 further includes a controller 40 that controls the operation of each device (each unit).

Each of the image forming units 1Y, 1M, 1C, and 1K of the image forming apparatus 100 includes a photoreceptor 11 (an example of the image holding member) that holds a toner image formed on the surface and that rotates in the direction of arrow A.

Near the circumference of the photoreceptor 11, a charger 12 that charges the photoreceptor 11 and that serves as an example of the charging unit is disposed, and a laser exposure unit 13 that writes an electrostatic latent image on the photoreceptor 11 and that serves as an example of the electrostatic latent image forming unit (in the figure, an exposure beam is denoted by symbol Bm) is disposed.

Near the circumference of the photoreceptor 11, a developing unit 14 that contains a toner of a color component and visualizes the electrostatic latent image on the photoreceptor 11 with the toner and that serves as an example of the developing unit is disposed, and a first transfer roller 16 that transfers the toner image of the color component formed on the photoreceptor 11 onto the intermediate transfer belt 15 in the corresponding first transfer section 10 is disposed.

A photoreceptor cleaner 17 that removes the toner remaining on the photoreceptor 11 is further disposed near the circumference of the photoreceptor 11. Electrophotographic devices including the charger 12, the laser exposure unit 13, the developing unit 14, the first transfer roller 16, and the photoreceptor cleaner 17 are sequentially arranged in the rotation direction of the photoreceptor 11. The image forming units 1Y, 1M, 1C, and 1K are arranged in a substantially linear manner in the order of yellow (Y), magenta (M), cyan (C), and black (K) from the upstream side of the intermediate transfer belt 15.

The intermediate transfer belt 15 is driven in a circulatory manner (i.e., rotated) by various types of rollers at an intended speed in the direction of arrow B illustrated in FIG. 1. The various types of rollers include a driving roller 31 driven by a highly-constant-speed motor (not illustrated) to rotate the intermediate transfer belt 15, a support roller 32 that supports the intermediate transfer belt 15 extending in a substantially linear manner in the arrangement direction of the photoreceptors 11, a tension applying roller 33 that applies tension to the intermediate transfer belt 15 and that functions as a correction roller for preventing the intermediate transfer belt 15 from meandering, a back roller 25 disposed in the second transfer section 20, and a cleaning back roller 34 disposed in a cleaning unit that scrapes off the toner remaining on the intermediate transfer belt 15.

The first transfer section 10 is formed by the first transfer roller 16 disposed to face the photoreceptor 11 with the intermediate transfer belt 15 therebetween. The first transfer roller 16 is disposed in pressure contact with the photoreceptor 11 with the intermediate transfer belt 15 therebetween. Furthermore, a voltage (first transfer bias) with a polarity opposite to the charge polarity of the toner (negative polarity, the same applies hereinafter) is applied to the first transfer roller 16. Accordingly, the toner images on the photoreceptors 11 are sequentially electrostatically attracted to the intermediate transfer belt 15 to form toner images that are superimposed on the intermediate transfer belt 15.

The second transfer section 20 includes the back roller 25 and a second transfer roller 22 disposed on the toner-image holding surface side of the intermediate transfer belt 15.

The back roller 25 is formed so as to have a surface resistivity of $1\times10^{7}$ Ω/□ or more and $1\times10^{10}$Ω/□ or less, and the hardness of the back roller 25 is set to, for example, 70° (ASKER C: manufactured by Kobunshi Keiki Co., Ltd., the same applies hereinafter). The back roller 25 is disposed on the back surface side of the intermediate transfer belt 15 and forms a counter electrode of the second transfer roller 22. A metallic power feed roller 26 to which a second transfer bias is stably applied is disposed in contact with the back roller 25.

On the other hand, the second transfer roller 22 is a cylindrical roller having a volume resistivity of $10^{7.5}$ Ω·cm or more and $10^{8.5}$ Ω·cm or less. The second transfer roller 22 is disposed in pressure contact with the back roller 25 with the intermediate transfer belt 15 therebetween. Furthermore, the second transfer roller 22 is grounded, and the second transfer bias is formed between the second transfer roller 22 and the back roller 25. The toner images are second-transferred onto a paper sheet K transported to the second transfer section 20.

An intermediate transfer belt cleaning member 35 is disposed downstream of the second transfer section 20 so as to be separable from the intermediate transfer belt 15. The intermediate transfer belt cleaning member 35 removes the toner and paper powder remaining on the intermediate transfer belt 15 after second transfer to clean the outer peripheral surface of the intermediate transfer belt 15.

A second transfer roller cleaning member 22A is disposed downstream of the second transfer roller 22 of the second transfer section 20. The second transfer roller cleaning member 22A removes the toner and paper powder remaining on the second transfer roller 22 after second transfer to clean the outer peripheral surface of the intermediate transfer belt 15. An example of the second transfer roller cleaning member 22A may be a cleaning blade. A cleaning roller may also be used.

The intermediate transfer belt 15, the first transfer rollers 16, the second transfer roller 22, and the intermediate transfer belt cleaning member 35 correspond to an example of the transfer device.

Figure 2:
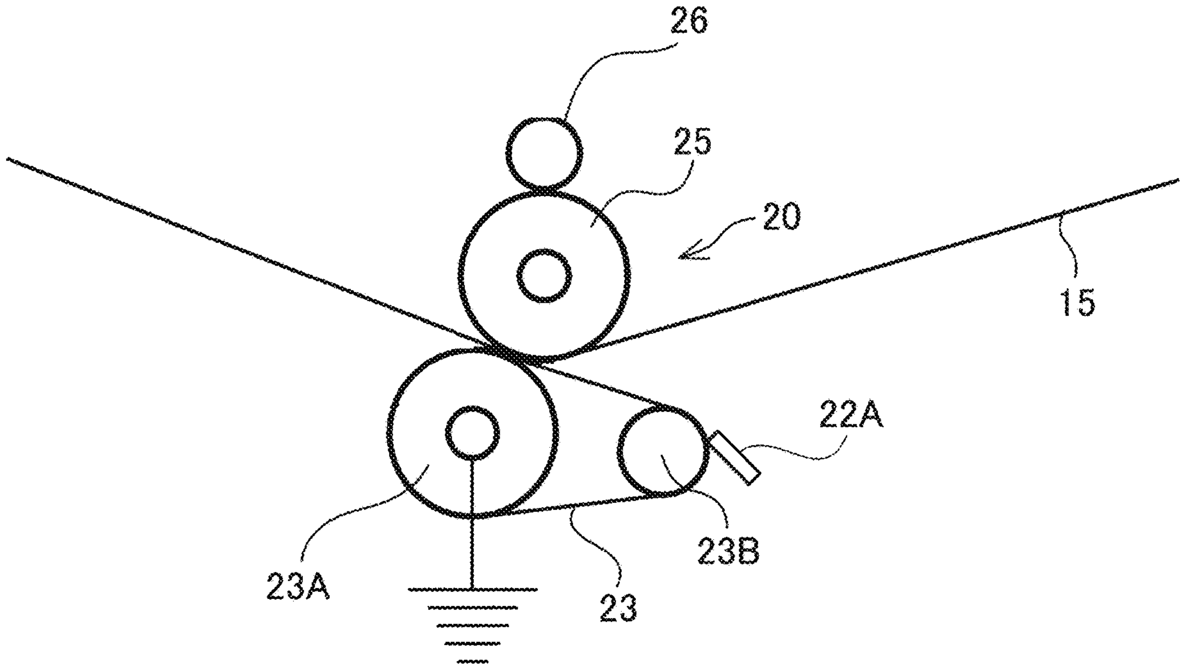
FIG. 2 is a schematic diagram illustrating the periphery of a second transfer section in another example of the image forming apparatus according to the exemplary embodiment.

Herein, the image forming apparatus 100 may include a second transfer belt (an example of the second transfer member) instead of the second transfer roller 22. Specifically, as illustrated in FIG. 2, the image forming apparatus 100 may include a second transfer unit including a second transfer belt 23, a driving roller 23A disposed to face the back roller 25 with the intermediate transfer belt 15 and the second transfer belt 23 interposed therebetween, and an idler roller 23B that supports the second transfer belt 23 under tension together with the driving roller 23A.

A reference sensor (home position sensor) 42 that generates a reference signal serving as a reference for taking image formation timings in the image forming units 1Y, 1M, 1C, and 1K is disposed upstream of the yellow image forming unit 1Y. An image density sensor 43 for adjusting an image quality is disposed downstream of the black image forming unit 1K. The reference sensor 42 generates the reference signal upon recognizing a mark provided on the back side of the intermediate transfer belt 15. The controller 40 sends instructions based on the recognition of the reference signal, and the image forming units 1Y, 1M, 1C, and 1K each start forming an image in accordance with the instructions.

The image forming apparatus according to the exemplary embodiment further includes, as a transport unit that transports a paper sheet K, a paper sheet container 50 that contains paper sheets K; a paper feed roller 51 that picks up and transports the paper sheets K stacked in the paper sheet container 50 at predetermined timings; transport rollers 52 that transport each paper sheet K drawn by the paper feed roller 51; a transport guide 53 that feeds the paper sheet K transported by the transport rollers 52 to the second transfer section 20; a transport belt 55 that transports, to the fixing device 60, the paper sheet K transported after second transfer by the second transfer roller 22; and a fixing inlet guide 56 that guides the paper sheet K to the fixing device 60.

Next, a basic image forming process of the image forming apparatus according to the exemplary embodiment will be described.

In the image forming apparatus according to the exemplary embodiment, image data output from, for example, an unillustrated image reader or personal computer (PC) is subjected to image processing in an unillustrated image processing device, and image forming operations are then performed by the image forming units 1Y, 1M, 1C, and 1K.

In the image processing device, the input image data is subjected to various types of image processing such as shading correction, misregistration correction, lightness/color space conversion, gamma correction, frame deletion, and various types of image editing, e.g., color editing and move editing. The image data that has been subjected to the image processing is converted into four types of colorant gradation data including Y color data, M color data, C color data, and K color data and output to the respective laser exposure units 13.

In each of the laser exposure units 13, the photoreceptor 11 of a corresponding one of the image forming units 1Y, 1M, 1C, and 1K is irradiated with the exposure beam Bm emitted from, for example, a semiconductor laser in accordance with the input colorant gradation data. In each of the image forming units 1Y, 1M, 1C, and 1K, the surface of the photoreceptor 11 is charged by the charger 12 and is then scanned and exposed with the laser exposure unit 13, and an electrostatic latent image is thereby formed. The formed electrostatic latent images are developed as Y, M, C, and K color toner images by the image forming units 1Y, 1M, 1C, and 1K, respectively.

The toner images formed on the photoreceptors 11 of the image forming units 1Y, 1M, 1C, and 1K are transferred onto the intermediate transfer belt 15 in the first transfer sections 10 in which the photoreceptors 11 come into contact with the intermediate transfer belt 15. More specifically, in each of the first transfer sections 10, a voltage (first transfer bias) with a polarity opposite to the charge polarity (negative polarity) of the toner is applied by the first transfer roller 16 to a base of the intermediate transfer belt 15. The toner images are thereby sequentially superimposed onto the outer peripheral surface of the intermediate transfer belt 15 so as to perform the first transfer.

After the toner images are sequentially first-transferred onto the outer peripheral surface of the intermediate transfer belt 15, the intermediate transfer belt 15 moves, and the toner images are transported toward the second transfer section 20. When the toner images are transported toward the second transfer section 20, in the transport unit, the paper feed roller 51 starts rotating at the timing of transportation of the toner images toward the second transfer section 20 to feed a paper sheet K with an intended size from the paper sheet container 50. The paper sheet K fed by the paper feed roller 51 is transported by the transport rollers 52 and reaches the second transfer section 20 through the transport guide 53. Before the paper sheet K reaches the second transfer section 20, the paper sheet K is temporarily stopped. A registration roller (not illustrated) starts rotating at a timing in synchronization with the movement of the intermediate transfer belt 15 on which the toner images are held, and the position of the paper sheet K is thereby aligned with the position of the toner images.

In the second transfer section 20, the second transfer roller 22 is pressed against the back roller 25 with the intermediate transfer belt 15 interposed therebetween. In this case, the paper sheet K transported at the appropriate timing is inserted between the intermediate transfer belt 15 and the second transfer roller 22. Here, when a voltage (second transfer bias) with the same polarity as the charge polarity (negative polarity) of the toner is applied from the power feed roller 26, a transfer electric field is formed between the second transfer roller 22 and the back roller 25. The unfixed toner images held on the intermediate transfer belt 15 are thereby electrostatically transferred onto the paper sheet K collectively in the second transfer section 20 in which the intermediate transfer belt 15 is pressurized by the second transfer roller 22 and the back roller 25.

The paper sheet K on which the toner images have been electrostatically transferred is then released from the intermediate transfer belt 15 and transported as it is by the second transfer roller 22 to the transport belt 55 disposed downstream of the second transfer roller 22 with respect to the transport direction of the paper sheet. The transport belt 55 transports the paper sheet K to the fixing device 60 at an optimal transport speed in the fixing device 60. The unfixed toner images on the paper sheet K transported to the fixing device 60 are subjected to fixing processing with heat and pressure by the fixing device 60 and thereby fixed onto the paper sheet K. The paper sheet K on which the fixed image has been formed is transported to a discharged sheet container (not illustrated) disposed in a discharge unit of the image forming apparatus.

After completion of transfer to the paper sheet K, the toner remaining on the intermediate transfer belt 15 is transported to the cleaning unit by the rotation of the intermediate transfer belt 15 and is removed from the intermediate transfer belt 15 by the cleaning back roller 34 and the intermediate transfer belt cleaning member 35.

Figure 3:
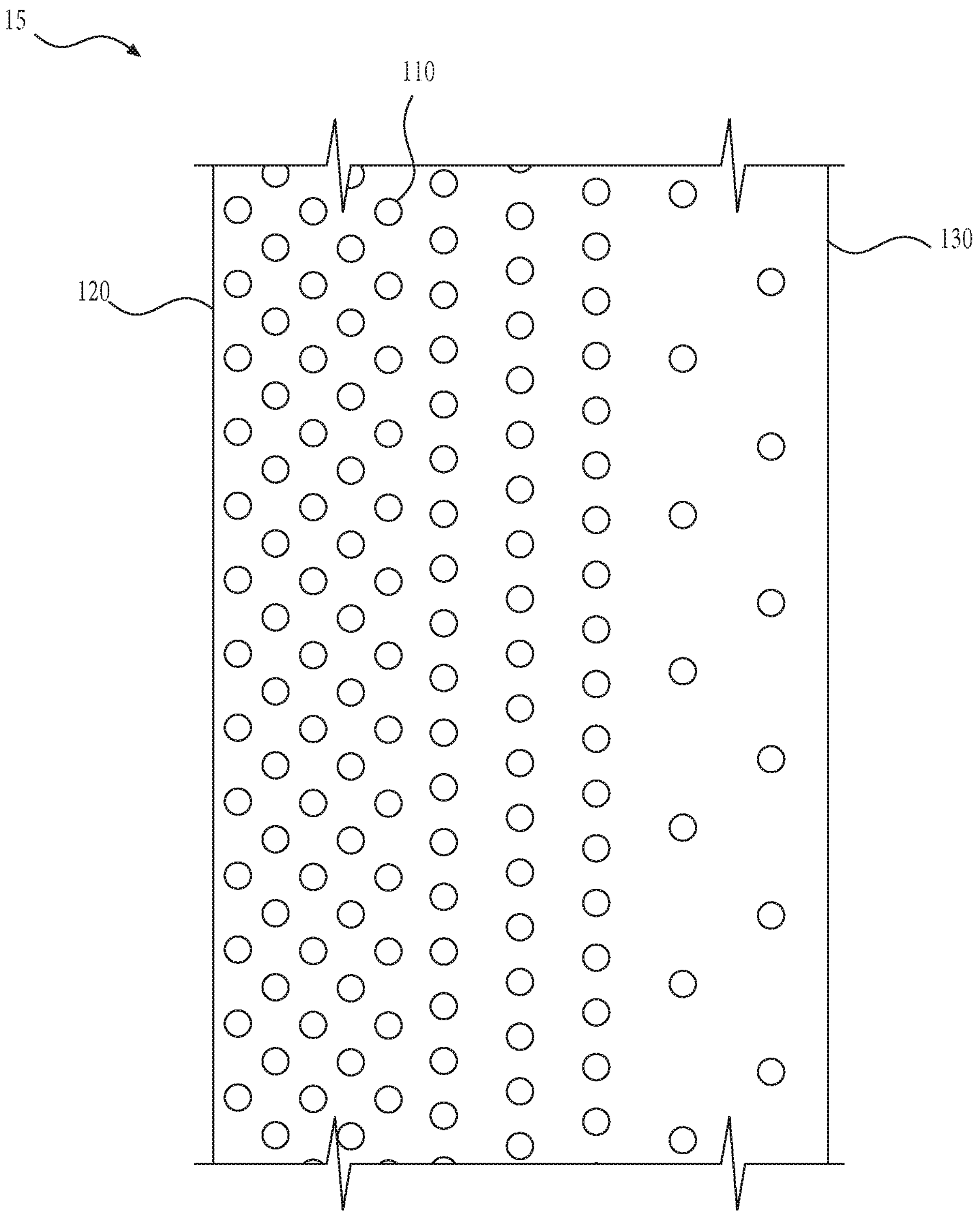
FIG. 3 is a schematic diagram illustrating an embodiment of an endless belt.

FIG. 3 depicts a schematic diagram of an embodiment of the intermediate transfer belt 15 with a schematic depiction of pores 110, and a fraction of the pores 110 increase from an outer peripheral surface side 130 toward an inner peripheral surface side 120.

Although the exemplary embodiments have been described, the present disclosure is not to be interpreted as being limited to the exemplary embodiments described above, and various modifications, changes, and improvements may be made to the exemplary embodiments.

EXAMPLES

Examples of the present disclosure will be described below, but the present disclosure is not limited to the following Examples. In the following description, "parts" and "%" are based on mass, unless otherwise specified.

Example 1

A solution (hereinafter, also referred to as "specific solution") containing a resin or a resin precursor, and electrically conductive particles is prepared as described below.

An N-methyl-2-pyrrolidone solution of a polyamic acid prepared from 3,3',4,4'-biphenyltetracarboxylic dianhydride and 4,4'-diaminodiphenyl ether (solid content after imide conversion: 18% by mass), which serves as a solution containing a resin or a resin precursor, carbon black (Special Black 4, manufactured by Orion Engineered Carbons), which serve as electrically conductive particles, and a silicone oil shown in Table 1 are dispersed using a high-pressure collision-type disperser to prepare a dispersion liquid.

The dispersion liquid and the N-methyl-2-pyrrolidone solution of the polyamic acid are kneaded such that the amount of carbon black is adjusted to 24 parts by mass relative to 100 parts by mass of the resin solid content to prepare a specific solution.

The amount of silicone oil added to the specific solution is adjusted as shown in Table 1.

An aluminum cylindrical body having an outer diameter of 366 mm and a length of 600 mm is prepared as a cylindrical die. A coating solution (that is, the specific solution) is discharged onto the outer peripheral surface of the cylindrical body at a width of 500 mm through a dispenser so as to have a thickness of 80 μm.

With the cylindrical body having a coating film thereon held horizontal, the coating film is dried by heating under the drying conditions shown in Table 1.

Next, the dried coating film is heated for 120 minutes such that the maximum temperature becomes 320° C. to form a resin coating film.

The die is manually pulled out to separate the resin coating film from the die. A central portion of the resin coating film in the axial direction is cut to a width of 363 mm to obtain an endless belt.

Examples 2 to 25 and Comparative Example 1

The type and the amount of silicone oil added, and drying conditions of the coating film are changed as shown in Table 1. Endless belts are obtained as in Example 1 except for this operation.

Comparative Example 2

The solution containing a resin or a resin precursor in Example 1 is changed to a polyamide-imide varnish (manufactured by Resonac, HPC-9000F-8, solid content: 13% by mass), which is a solution containing a resin, and the electrically conductive particles are changed to FW-1 (COLOR BLACK FW1, manufactured by Orion Engineered Carbons). An endless belt is obtained as in Example 1 except for this operation.

Evaluation

Evaluation of Properties

For each of the endless belts obtained in the Examples, the following properties are determined by the methods described above.

- Area fraction Ao of pores present on belt outer peripheral surface side in section in belt thickness direction
- Area fraction Am of pores present in belt thickness center portion in section in belt thickness direction
- Area fraction Ai of pores present on belt inner peripheral surface side in section in belt thickness direction
- Area fraction A of pores when outer peripheral surface is observed
- Average pore diameter Do of pores present on belt outer peripheral surface side in section in belt thickness direction
- Average pore diameter Dm of pores present in belt thickness center portion in section in belt thickness direction
- Average pore diameter Di of pores present on belt inner peripheral surface side in section in belt thickness direction
- Young's modulus

Bending Resistance

For each of the endless belts obtained in the Examples, bending resistance is evaluated as follows.

The endless belt is repeatedly bent using a bend tester under the test conditions of bend radius: 0.38 mm, bending angle: 135 degrees, bending speed: 175 back-and-forth motions/min. With regard to the bending direction, the test is performed such that the back surface side of the belt corresponds to the compression direction, and the number of times of bending until the endless belt is broken is evaluated.

The results are shown in Table 1. The details of abbreviations or the like in Table 1 are as follows.

- PI: Polyimide resin
- PAI: Polyamide-imide resin
- SB4: Carbon black particles (Special Black 4, manufactured by Orion Engineered Carbons)
- FW1: Carbon black particles (COLOR BLACK FW1, manufactured by Orion Engineered Carbons)
- KF-352A: Polyether-modified silicone oil (KF-352A, manufactured by Shin-Etsu Chemical Co., Ltd., number-average molecular weight=2,000)
- BYK-307: Polyether-modified silicone oil (BYK-307, manufactured by BYK Japan KK, number-average molecular weight=1,600)
- KF-6012: Polyether-modified silicone oil (KF-6012, manufactured by Shin-Etsu Chemical Co., Ltd., number-average molecular weight=1,800)
- KF-6015: Polyether-modified silicone oil (KF-6015, manufactured by Shin-Etsu Chemical Co., Ltd., number-average molecular weight=300)

TABLE 1

| | Belt component | | | | Coating film drying conditions | | | Area fraction of pores (%) | | | |
|---|---|---|---|---|---|---|---|---|---|---|---|
| | Resin Type | Electrically conductive particle Type | Silicone oil Type | Silicone oil Amount added (mass %) | Drying temperature (° C.) | Drying air speed (m/s) | Drying time (min) | Section Outer peripheral surface side Ao | Section Thickness center portion Am | Section Inner peripheral surface side Ai | Outer peripheral surface A |
| Example 1 | PI | SB4 | KF-352A | 6.0 | 170 | 0.5 | 20 | 0.35% | 4.00% | 15.0% | 0.18% |
| Example 2 | PI | SB4 | BYK-307 | 1.7 | 140 | 0.4 | 30 | 0.00% | 1.00% | 2.1% | 0.00% |
| Example 3 | PI | SB4 | KF-352A | 1.5 | 140 | 0.4 | 30 | 0.05% | 0.80% | 2.2% | 0.01% |
| Example 4 | PI | SB4 | KF-352A | 3.0 | 140 | 1.5 | 30 | 1.50% | 1.80% | 3.0% | 0.90% |
| Example 5 | PI | SB4 | KF-352A | 5.0 | 140 | 2.0 | 30 | 1.80% | 3.20% | 8.5% | 1.15% |
| Example 6 | PI | SB4 | KF-6012 | 1.5 | 170 | 0.5 | 20 | 0.20% | 0.40% | 1.5% | 0.10% |
| Example 7 | PI | SB4 | KF-6012 | 2.0 | 170 | 0.5 | 20 | 0.30% | 0.50% | 2.0% | 0.15% |
| Example 8 | PI | SB4 | KF-6012 | 3.0 | 140 | 0.8 | 30 | 1.00% | 5.00% | 8.0% | 0.50% |
| Example 9 | PI | SB4 | KF-6012 | 5.0 | 140 | 1.5 | 30 | 1.40% | 6.00% | 9.0% | 0.70% |
| Example 10 | PI | SB4 | KF-6012 | 1.5 | 140 | 0.8 | 30 | 0.80% | 1.40% | 1.8% | 0.40% |
| Example 11 | PI | SB4 | KF-6012 | 2.0 | 140 | 0.8 | 30 | 1.00% | 1.50% | 2.0% | 0.50% |
| Example 12 | PI | SB4 | KF-352A | 4.0 | 185 | 2.0 | 15 | 1.20% | 4.00% | 19.8% | 0.60% |
| Example 13 | PI | SB4 | KF-352A | 4.5 | 185 | 2.0 | 15 | 1.30% | 4.50% | 21.5% | 0.65% |
| Example 14 | PI | SB4 | BYK-307 | 1.9 | 140 | 0.4 | 30 | 0.05% | 1.50% | 2.2% | 0.03% |
| Example 15 | PI | SB4 | KF-352A | 1.5 | 170 | 0.5 | 20 | 0.08% | 0.80% | 4.0% | 0.04% |
| Example 16 | PI | SB4 | KF-352A | 2.5 | 170 | 1.5 | 20 | 1.40% | 1.70% | 5.0% | 0.60% |
| Example 17 | PI | SB4 | KF-352A | 3.2 | 140 | 1.5 | 30 | 1.50% | 1.60% | 2.0% | 0.60% |
| Example 18 | PI | SB4 | BYK-307 | 3.0 | 185 | 0.4 | 15 | 0.05% | 1.30% | 20.0% | 0.03% |
| Example 19 | PI | SB4 | BYK-307 | 4.0 | 185 | 0.4 | 15 | 0.10% | 2.00% | 19.0% | 0.05% |

TABLE 1-continued

| | | | | | | | | | | | |
|---|---|---|---|---|---|---|---|---|---|---|---|
| Example 20 | PI | SB4 | KF-6012 | 5.5 | 140 | 1.5 | 30 | 1.50% | 8.00% | 10.0% | 0.75% |
| Example 21 | PI | SB4 | KF-6012 | 6.0 | 140 | 1.5 | 30 | 1.40% | 8.50% | 10.0% | 0.70% |
| Example 22 | PI | SB4 | KF-6012 | 1.5 | 140 | 0.4 | 30 | 0.05% | 0.80% | 2.2% | 0.01% |
| Example 23 | PI | SB4 | BYK-307 | 3.5 | 110 | 0.4 | 50 | 0.80% | 2.60% | 12.0% | 0.40% |
| Example 24 | PI | SB4 | BYK-307 | 4.5 | 110 | 0.8 | 50 | 1.10% | 3.00% | 15.0% | 0.55% |
| Example 25 | PI | SB4 | KF-6015 | 6.0 | 170 | 0.5 | 20 | 0.10% | 1.50% | 2.00% | 0.05% |
| Com. Ex. 1 | PI | SB4 | None | None | 140 | 0.4 | 30 | 0.08% | 0.08% | 0.08% | 0.04% |
| Com. Ex. 2 | PAI | FW1 | None | None | 140 | 0.8 | 30 | 0.11% | 0.12% | 0.11% | 0.05% |

| | Area fraction of pores (%) | | Average pore diameter of pores (µm) | | | | | | |
|---|---|---|---|---|---|---|---|---|---|
| | | | Section Outer peripheral surface side | Section Thickness center portion | Section Inner peripheral surface side | | | Young's modulus | Bending |
| | Ao/Am | Am/Ai | Do | Dm | Di | Do/Dm | Dm/Di | (MPa) | resistance |
| Example 1 | 0.1 | 0.3 | 0.5 | 2.7 | 5.0 | 0.2 | 0.5 | 3420 | 18102 |
| Example 2 | 0.0 | 0.5 | 0.0 | 0.7 | 0.7 | 0.0 | 1.0 | 3520 | 11000 |
| Example 3 | 0.1 | 0.4 | 0.1 | 0.5 | 0.7 | 0.1 | 0.7 | 3480 | 12503 |
| Example 4 | 0.8 | 0.6 | 1.7 | 1.2 | 1.0 | 1.4 | 1.2 | 3420 | 15650 |
| Example 5 | 0.6 | 0.4 | 2.0 | 2.1 | 2.8 | 0.9 | 0.8 | 3400 | 9050 |
| Example 6 | 0.5 | 0.3 | 0.2 | 0.3 | 0.5 | 0.8 | 0.5 | 3510 | 9120 |
| Example 7 | 0.6 | 0.3 | 0.3 | 0.3 | 0.7 | 1.0 | 0.5 | 3480 | 11900 |
| Example 8 | 0.2 | 0.6 | 1.1 | 3.3 | 2.7 | 0.3 | 1.3 | 3350 | 14852 |
| Example 9 | 0.2 | 0.7 | 1.5 | 4.0 | 3.0 | 0.4 | 1.3 | 3150 | 11950 |
| Example 10 | 0.6 | 0.8 | 0.9 | 0.9 | 0.6 | 0.9 | 1.6 | 3490 | 11253 |
| Example 11 | 0.7 | 0.8 | 1.1 | 1.0 | 0.7 | 1.1 | 1.5 | 3470 | 11300 |
| Example 12 | 0.3 | 0.2 | 1.3 | 2.7 | 6.6 | 0.5 | 0.4 | 3200 | 17800 |
| Example 13 | 0.3 | 0.2 | 1.4 | 3.0 | 7.2 | 0.5 | 0.4 | 3100 | 18100 |
| Example 14 | 0.0 | 0.7 | 0.1 | 1.0 | 0.7 | 0.1 | 1.4 | 3520 | 11000 |
| Example 15 | 0.1 | 0.2 | 0.1 | 0.5 | 1.3 | 0.2 | 0.4 | 3530 | 10000 |
| Example 16 | 0.8 | 0.3 | 1.3 | 1.1 | 1.7 | 1.2 | 0.7 | 3390 | 12500 |
| Example 17 | 0.9 | 0.8 | 1.3 | 1.0 | 0.7 | 1.3 | 1.5 | 3400 | 11560 |
| Example 18 | 0.0 | 0.1 | 0.1 | 0.9 | 6.7 | 0.1 | 0.1 | 3100 | 14100 |
| Example 19 | 0.1 | 0.1 | 0.1 | 1.3 | 6.3 | 0.1 | 0.2 | 3250 | 16120 |
| Example 20 | 0.2 | 0.8 | 1.7 | 5.0 | 3.3 | 0.3 | 1.5 | 3150 | 16025 |
| Example 21 | 0.2 | 0.9 | 1.5 | 5.7 | 3.3 | 0.3 | 1.7 | 3130 | 13500 |
| Example 22 | 0.1 | 0.4 | 0.1 | 0.3 | 0.6 | 0.3 | 0.5 | 3480 | 10520 |
| Example 23 | 0.3 | 0.2 | 0.5 | 3.5 | 9.8 | 0.1 | 0.4 | 2900 | 15624 |
| Example 24 | 0.4 | 0.2 | 0.6 | 2.5 | 13.0 | 0.2 | 0.2 | 2800 | 16520 |
| Example 25 | 0.1 | 0.8 | 0.5 | 2.7 | 5.0 | 0.2 | 0.5 | 3400 | 9800 |
| Com. Ex. 1 | 1.0 | 1.0 | 1.5 | 1.4 | 1.5 | 1.1 | 0.9 | 3400 | 6800 |
| Com. Ex. 2 | 1.0 | 1.0 | 1.5 | 1.4 | 1.5 | 1.1 | 0.9 | 5000 | 2100 |

Com. Ex.: Comparative Example

The above results show that the bending resistance during rotational driving is better in each of the endless belts of Examples than in each of the endless belts of Comparative Examples.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1))) An endless belt containing:

a resin and electrically conductive particles, wherein the endless belt has pores inside, and the pores are present such that a fraction of the pores increases from an outer peripheral surface side toward an inner peripheral surface side.

(((2))) The endless belt according to (((1))), wherein, in a section in a belt thickness direction, an area fraction Ao of the pores present on the outer peripheral surface side is 0.05% or more and 1.5% or less, an area fraction Am of the pores present in a thickness center portion is 1.0% or more and 5.0% or less, and an area fraction Ai of the pores present on the inner peripheral surface side is 2.0% or more and 20.0% or less.

(((3))) The endless belt according to (((2))), wherein a ratio Ao/Am of the area fraction Ao of the pores to the area fraction Am of the pores is 0.1 or more and 0.8 or less, and a ratio Am/Ai of the area fraction Am of the pores to the area fraction Ai of the pores is 0.1 or more and 0.8 or less.

(((4))) The endless belt according to any one of (((1))) to (((3))), wherein an area fraction A of the pores when an outer peripheral surface is observed is 0.01% or more and 1.0% or less.

(((5))) The endless belt according to any one of (((1))) to (((4))), wherein, in a section in a belt thickness direction, an average pore diameter Do of the pores present on the outer peripheral surface side is 0 μm or more and 1.5 μm or less, an average pore diameter Dm of the pores present in a thickness center portion is 0.5 μm or more and 5.0 μm or less, and an average pore diameter Di of the pores present on the inner peripheral surface side is 0.6 μm or more and 10.0 μm or less.

(((6))) The endless belt according to any one of (((1))) to (((5))), containing a silicone oil.

(((7))) The endless belt according to (((6))), wherein the silicone oil is a polyether-modified silicone oil.

(((8))) The endless belt according to (((7))), wherein the polyether-modified silicone oil has a number-average molecular weight of 300 or more and 10,000 or less.

(((9))) The endless belt according to any one of (((1))) to (((8))), wherein the resin is a polyimide-based resin.

(((10))) An intermediate transfer belt including the endless belt according to any one of (((1))) to (((9))).

(((11))) A transfer device including:

an intermediate transfer belt having an outer peripheral surface onto which a toner image is to be transferred, the intermediate transfer belt including the endless belt according to any one of (((1))) to (((9)));

a first transfer unit including a first transfer member that first-transfers a toner image formed on a surface of an image holding member onto the outer peripheral surface of the intermediate transfer belt; and a second transfer unit including a second transfer member that is disposed in contact with the outer peripheral surface of the intermediate transfer belt and that second-transfers the toner image transferred onto the outer peripheral surface of the intermediate transfer belt onto a surface of a recording medium.

(((12))) An image forming apparatus including:

a toner image forming device that includes an image holding member and that forms a toner image on a surface of the image holding member; and a transfer device that transfers the toner image formed on the surface of the image holding member onto a surface of a recording medium, the transfer device being the transfer device according to (((11))).

What is claimed is:

1. An endless belt comprising:

a resin; and electrically conductive particles, wherein the endless belt has pores inside, and the pores are present such that a fraction of the pores increases from an outer peripheral surface side toward an inner peripheral surface side, and wherein, in a section in a belt thickness direction, an area fraction Ao of the pores present on the outer peripheral surface side is 0% or more and 2.0% or less, an area fraction Am of the pores present in a thickness center portion is 0.5% or more and 8.5% or less, and an area fraction Ai of the pores present on the inner peripheral surface side is 1.5% or more and 21.5% or less.

2. The endless belt according to claim 1, wherein a ratio Ao/Am of the area fraction Ao of the pores to the area fraction Am of the pores is 0.1 or more and 0.8 or less, and a ratio Am/Ai of the area fraction Am of the pores to the area fraction Ai of the pores is 0.1 or more and 0.8 or less.

3. The endless belt according to claim 1, wherein an area fraction A of the pores when an outer peripheral surface is observed is 0.01% or more and 1.0% or less.

4. The endless belt according to claim 1, wherein, in a section in a belt thickness direction, an average pore diameter Do of the pores present on the outer peripheral surface side is 0 μm or more and 1.5 μm or less, an average pore diameter Dm of the pores present in a thickness center portion is 0.5 μm or more and 5.0 μm or less, and an average pore diameter Di of the pores present on the inner peripheral surface side is 0.6 μm or more and 10.0 μm or less.

5. The endless belt according to claim 1, comprising a silicone oil.

6. The endless belt according to claim 5, wherein the silicone oil is a polyether-modified silicone oil.

7. The endless belt according to claim 6, wherein the polyether-modified silicone oil has a number-average molecular weight of 300 or more and 10,000 or less.

8. The endless belt according to claim 1, wherein the resin is a polyimide-based resin.

9. An intermediate transfer belt comprising the endless belt according to claim 1.

10. An intermediate transfer belt comprising the endless belt according to claim 2.

11. An intermediate transfer belt comprising the endless belt according to claim 3.

12. An intermediate transfer belt comprising the endless belt according to claim 4.

13. An intermediate transfer belt comprising the endless belt according to claim 5.

14. An intermediate transfer belt comprising the endless belt according to claim 6.

15. An intermediate transfer belt comprising the endless belt according to claim 7.

16. An intermediate transfer belt comprising the endless belt according to claim 8.

17. A transfer device comprising:

an intermediate transfer belt having an outer peripheral surface onto which a toner image is to be transferred, the intermediate transfer belt including the endless belt according to claim 1;

a first transfer unit including a first transfer member that first-transfers a toner image formed on a surface of an image holding member onto the outer peripheral surface of the intermediate transfer belt; and a second transfer unit including a second transfer member that is disposed in contact with the outer peripheral surface of the intermediate transfer belt and that second-transfers the toner image transferred onto the outer peripheral surface of the intermediate transfer belt onto a surface of a recording medium.

18. An image forming apparatus comprising:

a toner image forming device that includes an image holding member and that forms a toner image on a surface of the image holding member; and a transfer device that transfers the toner image formed on the surface of the image holding member onto a surface of a recording medium, the transfer device being the transfer device according to claim 17.

* * * * *